United States Patent
Chang et al.

(10) Patent No.: US 11,337,105 B2
(45) Date of Patent: May 17, 2022

(54) TRIGGERING OF BITRATE REQUEST FOR CODEC RATE ADAPTATION

(71) Applicants: Kyocera Corporation, Kyoto (JP); Henry Chang, San Diego, CA (US); Masato Fujishiro, Yokohama (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/477,322

(22) PCT Filed: Feb. 2, 2018

(86) PCT No.: PCT/US2018/016718
§ 371 (c)(1),
(2) Date: Jul. 11, 2019

(87) PCT Pub. No.: WO2018/144926
PCT Pub. Date: Aug. 9, 2018

(65) Prior Publication Data
US 2019/0373501 A1    Dec. 5, 2019

Related U.S. Application Data (60) Provisional application No. 62/454,469, filed on Feb. 3, 2017.

(51) Int. Cl.
*H04W 72/08* (2009.01)
*H04W 52/26* (2009.01)
(Continued)

(52) U.S. Cl.
CPC ....... *H04W 28/0268* (2013.01); *H04W 28/22* (2013.01); *H04W 36/0022* (2013.01); *H04W 48/14* (2013.01); *H04W 88/023* (2013.01)

(58) Field of Classification Search
CPC ......... H04L 69/28; H04L 47/38; H04L 47/25; H04L 65/608; H04W 48/14;
(Continued)

(56) References Cited

U.S. PATENT DOCUMENTS 8,375,124 B1 *   2/2013   Schwartz ................ H04L 67/06
                                                              709/224
11,228,958 B2 *  1/2022   Jhunjhunwala ....... H04L 1/0026
(Continued)

OTHER PUBLICATIONS

Kyocera "Feedback aspects for RAN-assisted codec rate adaption", Panasonic Nov. 14-18, 2016 (Year: 2016).*

(Continued)

*Primary Examiner* — Wutchung Chu
*Assistant Examiner* — Jason A Harley (57) ABSTRACT

A first user equipment (UE) device receives a configuration for a first timer from a base station that is serving the UE device. The first UE device also receives a recommended bitrate from the base station. The recommended bitrate is to be used for a Voice over Long-Term Evolution (VoLTE) call or a Video over Long-Term Evolution (ViLTE) call between the first UE device and a second UE device. The first UE device activates the first timer in accordance with the configuration. The first UE device is prohibited from transmitting a bitrate query to the base station while the first timer is running. Upon receiving a recommended bitrate that is below a Guaranteed Bit Rate for the call between the first UE device and the second UE device, the first UE device stops the first timer and transmits a bitrate query to the base station.

15 Claims, 4 Drawing Sheets

(51) Int. Cl.
*H04W 28/02* (2009.01)
*H04W 28/22* (2009.01)
*H04L 5/00* (2006.01)
*H04W 40/00* (2009.01)
*H04W 28/10* (2009.01)
*H04W 72/12* (2009.01)
*H04W 48/14* (2009.01)
*H04W 88/02* (2009.01)
*H04W 36/00* (2009.01)

(58) Field of Classification Search
CPC . H04W 28/0268; H04W 28/22; H04W 28/10; H04W 56/001; H04W 36/0022
USPC .......................................................... 370/252
See application file for complete search history.

(56) References Cited

U.S. PATENT DOCUMENTS

| | | | | |
|---|---|---|---|---|
| 2002/0071388 | A1* | 6/2002 | Bergsson | H04L 47/12 370/230 |
| 2004/0202109 | A1* | 10/2004 | Akiyama | H04N 21/8126 370/235 |
| 2005/0052997 | A1* | 3/2005 | Montes Linares | H04W 28/22 370/230 |
| 2010/0309788 | A1* | 12/2010 | Ho | H04W 28/0205 370/236 |
| 2011/0310852 | A1* | 12/2011 | Dimou | H04W 36/08 370/332 |
| 2012/0108250 | A1* | 5/2012 | Ahn | H04W 28/22 455/450 |
| 2012/0147946 | A1 | 6/2012 | Gao et al. | |
| 2012/0190362 | A1 | 7/2012 | Subbarayudu et al. | |
| 2014/0064124 | A1* | 3/2014 | Paladugu | H04W 76/19 370/252 |
| 2014/0066084 | A1* | 3/2014 | Paladugu | H04W 72/087 455/452.2 |
| 2015/0036663 | A1* | 2/2015 | Kilpatrick, II | H04W 36/0085 370/332 |
| 2015/0195753 | A1 | 7/2015 | Jung et al. | |
| 2015/0271755 | A1* | 9/2015 | Karri | H04W 28/0221 370/252 |
| 2015/0358483 | A1* | 12/2015 | Jeong | H04W 28/0289 370/328 |
| 2016/0112921 | A1* | 4/2016 | Nagasaka | H04W 36/02 370/331 |
| 2016/0183276 | A1* | 6/2016 | Marinier | H04W 72/04 370/329 |
| 2017/0353844 | A1* | 12/2017 | Nylander | H04W 12/062 |
| 2018/0102871 | A1* | 4/2018 | Wu | H04W 36/00 |
| 2018/0103497 | A1* | 4/2018 | Chiang | H04L 65/1069 |
| 2018/0160445 | A1* | 6/2018 | Babaei | H04W 72/14 |
| 2018/0302760 | A1* | 10/2018 | Liu | H04W 4/16 |
| 2019/0349807 | A1* | 11/2019 | Bergstrom | H04L 47/32 |

OTHER PUBLICATIONS

"Change Request 36.300 CR CRNum rev—Current Version 14.0. 0"; R2-169175; 3GPP TSG RAN WG2 #96; Nov. 14-18, 2016; Reno, US.

Kyocera; "Other triggering needs with bitrate query"; R2-1701673; 3GPP TSG RAN WG2 #97; Feb. 13-17, 2017; Athens, GR.

Panasonic; "On RAN-assisted codec adaptation"; R2-168177; 3GPP TSG RAN WG2 #96; Nov. 14-18, 2016; Reno, US.

Kyocera; "Feedback aspects for RAN-assisted codec rate adaptation"; R2-168033; 3GPP TSG RAN WG2 #96; Nov. 14-18, 2016; Reno, US.

* cited by examiner

TRIGGERING OF BITRATE REQUEST FOR CODEC RATE ADAPTATION

CLAIM OF PRIORITY

The present application claims priority to Provisional Application No. 62/454,469, entitled "TRIGGERING OF BITRATE REQUEST FOR CODEC RATE ADAPTATION", filed Feb. 3, 2017, assigned to the assignee hereof and hereby expressly incorporated by reference in its entirety.

FIELD

This invention generally relates to wireless communications and more particularly to rate adaptation in a radio access network.

BACKGROUND

3rd Generation Partnership Project (3GPP) specified a new voice codec named EVS (Enhanced Voice Services). A codec is a device or program that (1) encodes data for transmission and/or storage, and (2) decodes received data for playback, storage, and/or editing. EVS provides high voice quality over a wide range of rates, which allows the low EVS codec rates to still have sufficient quality, and may be used in poor coverage environments and overload scenarios. However, it is still desirable to use the higher codec rates for enhanced audio quality whenever possible. EVS has the flexibility, with a wider rate range and full audio bandwidth, to deliver speech quality that matches other audio inputs, such as stored music, while offering high robustness to delay, jitter, and packet losses.

Radio conditions may also impact the codec mode and codec rate. For example, under poor radio conditions, a lower codec rate may be used to reduce the packet loss, whereas a higher codec rate can be used in good radio conditions to ensure a better user experience. Therefore, a flexible and efficient codec modification mechanism is needed that accounts for the voice codec, network capacity, radio conditions, and user experience.

SUMMARY

A first user equipment (UE) device receives a configuration for a first timer from a base station that is serving the UE device. The first UE device also receives a recommended bitrate from the base station. The recommended bitrate is to be used for a Voice over Long-Term Evolution (VoLTE) call or a Video over Long-Term Evolution (ViLTE) call between the first UE device and a second UE device. The first UE device activates the first timer in accordance with the configuration. The first UE device is prohibited from transmitting a bitrate query to the base station while the first timer is running. Upon receiving a recommended bitrate that is below a Guaranteed Bit Rate for the call between the first UE device and the second UE device, the first UE device stops the first timer and transmits a bitrate query to the base station.

DETAILED DESCRIPTION

Voice-over-LTE (VoLTE) is a key feature for the 3GPP Long Term Evolution (LTE) communication specification to provide voice service and is being deployed and launched by operators all over the world, which makes VoLTE capability extremely important for operators. One of the critical factors that may impact the user experience of VoLTE service is the voice codec configuration. For example, a higher Adaptive Multi-Rate (AMR) voice code rate may provide a higher-definition voice call and accordingly a better user experience. When a higher AMR voice code rate is used, the higher codec rate requires more radio resource allocation, which implies less available network capacity.

The base station (e.g., eNB) of the Radio Access Network (RAN) is in the best position to trigger voice codec rate adaptation. Thus, an eNB-assisted (or RAN-assisted) codec rate adaptation solution should be considered. In order to support eNB-assisted codec rate adaptation, one of the main questions to consider is if the eNB needs to have the information on the specific codec rates for each type of supported codec. If we assume the eNB has specific information about the codec rates, we should also consider if the eNB would also need to know the codec type, the frame aggregation, the redundancy level, and the redundancy offset. This would imply the eNB could essentially serve as the end point for codec rate adaptation in place of the user equipment (UE) device.

However, if the eNB only has the codec rate information, it is unclear how much weight the UE device should give to the eNB's recommended codec rate as one of the inputs to the UE device's application layer. Note that traditionally eNBs do not handle any application layer signaling. Rather, they only handle the Access Stratum (AS) part of the LTE system. Adding application layer signaling within the eNB would drastically change the existing paradigm of how the network architecture is structured. Thus, the following examples describe techniques and system configurations that enable the eNB to facilitate rate adaptation despite not having codec rate information.

Moreover, as the UE device moves in and out of coverage, the eNB's selection of a recommended rate for the UE device should be a function of the UE device's radio condition and whether the recommended rate is applicable to the UE device when the UE device is handed over to a target eNB.

Although most of the examples discussed herein focus on VoLTE applications, any of the following examples may be modified for Video-over-LTE (ViLTE) applications.

Figure 1:
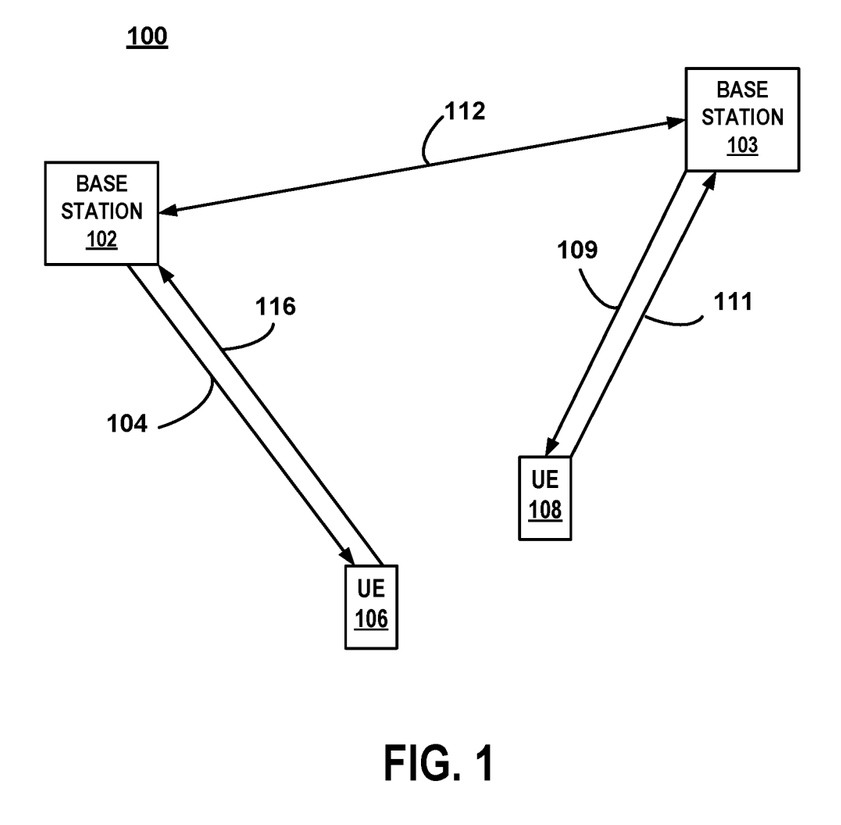
FIG. 1 is a block diagram of a communication system for an example in which a first timer is used to prohibit a user equipment (UE) device from transmitting a bitrate query until the UE device receives a recommended bitrate that is below a Guaranteed Bit Rate (GBR).

FIG. 1 is a block diagram of a communication system for an example in which a first timer is used to prohibit a user equipment (UE) device from transmitting a bitrate query until the UE device receives a recommended bitrate that is below a Guaranteed Bit Rate (GBR). The communication system 100 is part of a radio access network (not shown) that provides various wireless services to UE devices that are located within the respective service areas of the various base stations that are part of the radio access network. The base station 102 provides wireless services to UE device 106 via downlink signals 104.

In the interest of clarity and brevity, communication system 100 is shown as having only two base stations 102, 103. Initially, first base station 102 provides wireless services to UE device 106, and second base station 103 provides wireless services to UE device 108. However, in other examples, communication system 100 could have any suitable number of base stations. Base stations 102, 103, which are sometimes referred to as an eNodeB or eNB, communicate with the wireless user equipment (UE) devices 106, 108 by transmitting downlink signals 104, 109 to the UE devices 106, 108, respectively. Base stations 102, 103 receive uplink signals 116, 111 transmitted from the UE devices 106, 108, respectively. The UE devices 106, 108 are any wireless communication devices such as mobile phones, transceiver modems, personal digital assistants (PDAs), and tablets, for example.

Figure 2A:
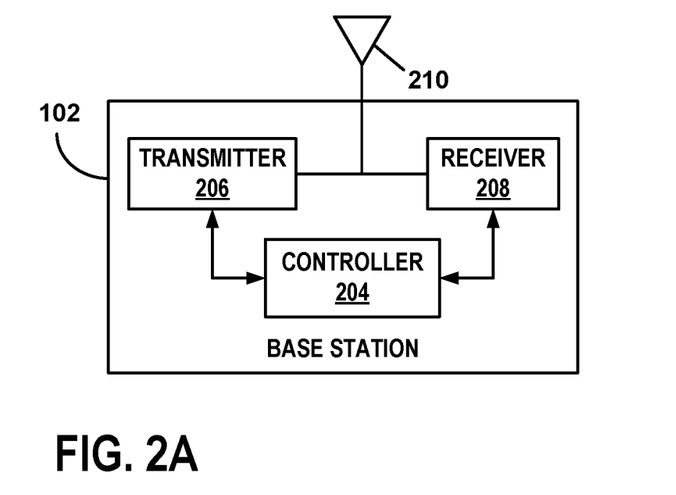
FIG. 2A is a block diagram of an example of the base stations shown in FIG. 1.

Base stations 102, 103 are connected to the network through a backhaul (not shown) in accordance with known techniques. As shown in FIG. 2A, base station 102 comprises controller 204, transmitter 206, and receiver 208, as well as other electronics, hardware, and code. Although FIG. 2A specifically depicts the circuitry and configuration of first base station 102, the same base station circuitry and configuration is utilized for second base station 103. The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals 104 and can apply any one of a plurality of modulation orders. The demodulator demodulates any signals, including uplink signals 116, received at the base station 102 in accordance with one of a plurality of modulation orders.

Figure 2B:
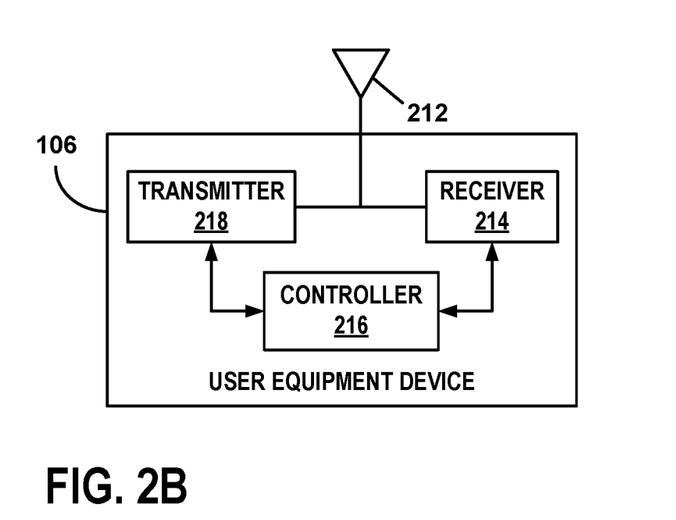
FIG. 2B is a block diagram of an example of the UE devices shown in FIG. 1.

Returning to FIG. 1, the communication system 100 provides various wireless services to the UE devices 106, 108 via base stations 102, 103, respectively. For the examples herein, the communication system 100 operates in accordance with at least one revision of the 3rd Generation Partnership Project Long Term Evolution (3GPP LTE) communication specification. A first UE device 106 receives downlink signal 104 via antenna 212 and receiver 214, as shown in FIG. 2B. Although FIG. 2B specifically depicts the circuitry and configuration of first UE device 106, the same UE device circuitry and configuration is utilized for second UE device 108. Besides antenna 212 and receiver 214, the first UE device 106 further comprises controller 216 and transmitter 218, as well as other electronics, hardware, and code. The first UE device 106 is any fixed, mobile, or portable equipment that performs the functions described herein. The various functions and operations of the blocks described with reference to the first UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate the signals to be transmitted as part of the uplink signals 116, which are shown in FIG. 1. The demodulator demodulates the downlink signals 104 in accordance with one of a plurality of modulation orders.

In some of the examples described herein, it is assumed that base stations 102, 103 are agnostic to codec rate information, which means that the base stations 102, 103 are not aware of which bitrates match with the codec rates available to the UE devices 106, 108 in the application layer. Therefore, the base station 102 must be informed regarding which bitrates are appropriate to recommend to the UE device 106; for purposes of rate adaptation, this is an important detail since the UE device 106 cannot autonomously decide which bitrate to use without permission from the base station 102.

In operation, one or more triggering events will cause a base station 102 to determine a bitrate to recommend to the UE device 106. In some examples, the base station 102 receives a bitrate query, which is a request for an unspecified rate increase or decrease for a particular communication link (e.g., downlink 104 or uplink 116). In other examples, the bitrate query comprises a request for a specific rate, which may, in some cases, be based on a rate negotiation request from a second UE device 108. If the base station 102 is codec rate agnostic, the bitrate query will be a request for a specific bitrate rather than for a specific codec rate.

The base station 102 utilizes controller 204 to determine a bitrate to recommend to the UE device 106. The recommended bitrate takes into account, among other factors, any previously received bitrate query, the radio condition of the first UE device 106, and the current level of network congestion measured by the base station 102. Of course, any other suitable criteria may be used by the base station 102 in selecting a recommended bitrate. In some cases, the recommended bitrate is a bitrate supported by the base station 102. The bitrate recommendation, in some examples, is a recommendation for a higher rate. In other examples, the bitrate recommendation is a recommendation for a lower rate.

Figure 3:
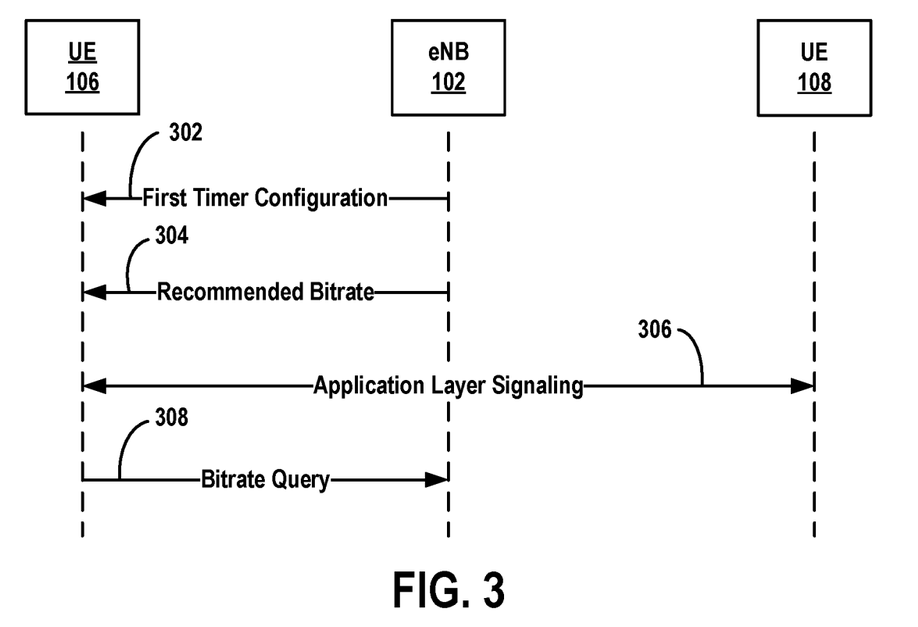
FIG. 3 is a messaging diagram of an example in which a first timer is used to prohibit a user equipment (UE) device from transmitting a bitrate query until the UE device receives a recommended bitrate that is below a Guaranteed Bit Rate (GBR).

After determining which bitrate to recommend to the UE device 106, the base station 102 transmits, via transmitter 206 and antenna 210, the recommended bitrate to be used for a call between the first UE device 106 and a second UE device 108. The call may be a Voice over Long-Term Evolution (VoLTE) call or a Video over Long-Term Evolution (ViLTE) call. The UE device 106 receives the recommended bitrate via antenna 212 and receiver 214. The recommended bitrate is represented in FIG. 3 by signal 304.

In addition to the recommended bitrate, the base station 102 transmits a configuration for a first timer to the UE device 106. The configuration may be transmitted with the recommended bitrate or in a separate transmission. The first timer configuration is represented in FIG. 3 by signal 302. Although not shown in FIG. 2B, the first timer is a Prohibit timer located within the UE device 106 that prohibits the UE device 106 from transmitting a bitrate query to the base station 102 when the first timer is running.

One advantage of using the first timer within the UE device 106 is that it allows the base station 102 to limit how often the UE device 106 transmits bitrate queries to the base station 102. For example, in some cases, the base station 102 configures the first timer to activate (e.g., start) when the UE device 106 transmits a bitrate query to the base station 102. The UE device 106 is prohibited from transmitting another bitrate query to the base station 102 until a predetermined amount of time has elapsed (e.g., until the first timer expires).

The configuration for the first timer specifies (1) which events will trigger the first timer to activate (e.g., start), restart, and stop, and (2) the duration of time that the first timer should run once the first timer has been activated or restarted. In some examples, the configuration specifies that the first timer is activated or restarted whenever the UE device 106 transmits a bitrate query. In other examples, the configuration specifies that the first timer should be restarted whenever the UE device 106 receives a recommended bitrate from the base station 102. In still other examples, the configuration specifies that the first timer should be stopped whenever the UE device 106 receives a recommended bitrate from the base station 102. In further examples, the configuration prevents the UE device 106 from stopping the first timer before the first timer expires.

In still further examples, the configuration specifies that the UE device 106, upon receiving a recommended bitrate that is below a Guaranteed Bit Rate (GBR) for the call, is to stop the first timer. The configuration can additionally specify that the UE device 106 is to transmit a bitrate query to the base station 102. Upon transmission of this bitrate query, the configuration specifies that the UE device 106 is to activate a second timer. Although not shown in FIG. 2B, the second timer is an Exceptional timer located within the UE device 106 that prohibits the UE device 106 from transmitting another bitrate query to the base station 102 when the second timer is running. The second timer is considered an Exceptional timer, which is utilized when the exceptional condition is satisfied (e.g., the UE device 106 receives a recommended bitrate that is below the Guaranteed Bit Rate). In the examples in which the first timer is allowed to keep running after the UE device 106 receives a recommended bitrate below the GBR, the configuration can specify that the UE device 106 is prevented from transmitting another bitrate query until the second timer expires, even if the first timer expires but the second timer is still running. The configuration for the second timer can be sent along with the configuration for the first timer in signal 302 of FIG. 3, or the configuration for the second timer can be sent in a separate transmission (not shown in FIG. 3).

In response to receiving the recommended bitrate from the base station 102, the controller 216 of first UE device 106 determines whether to (1) implement (e.g., accept) the recommended bitrate, (2) reject the recommended bitrate, (3) request a different bitrate than the recommended bitrate, (4) negotiate the bitrate with second UE device 108, or (5) perform any combination of two or more of the foregoing options. If the UE device 106 chooses to initiate a bitrate negotiation with the second UE device 108 to determine a bitrate to be used for the VoLTE call between the first and second UE devices 106, 108, the first UE device 106 and the second UE device 108 use their respective transmitters 218, controllers 216, and antennas 212 to negotiate the bitrate via the application layer. This bitrate negotiation occurs via communication link 112 in FIG. 1 and is represented in FIG. 3 by Application Layer Signaling 306.

In other examples, the first UE device 106 may already know which bitrate the second UE device 108 is capable of using for the VoLTE call, and thus, no negotiation is required. Once the bitrate negotiation between the first and second UE devices 106, 108 concludes, or is skipped, the first and second UE devices 106, 108 implement a bitrate for the VoLTE call, or the first UE device 106 may determine that a bitrate query should be sent to the base station 102.

If the UE device 106 determines that a bitrate query should be sent to the base station 102, the UE device 106 transmits, via transmitter 218 and antenna 212, a bitrate query to the base station 102. The bitrate query can be a request for an unspecified rate increase or for a specific rate increase. In the examples in which the base station 102 is codec rate agnostic, any specific rate request will be a request for a specific bitrate rather than for a specific codec rate.

The UE device 106 transmits, via transmitter 218 and antenna 212, the bitrate query to the base station 102. The base station 102 receives the bitrate query via antenna 210 and receiver 208. The bitrate query is represented in FIG. 3 by signal 308. Upon receipt of the bitrate query, the base station 102 will make a bitrate recommendation based on any number of factors, including one or more of the following: the bitrate query received from the UE device 106, the radio condition of the UE device 106, and the current level of network congestion measured by the base station 102. Of course, any other suitable factors could be considered by the base station 102 in determining which bitrate to recommend.

FIG. 3 is a messaging diagram of an example in which a base station provides a recommended bitrate to a UE device. In this example, the base station 102 transmits, via transmitter 206 and antenna 210, a configuration for the first timer to the UE device 106. The UE device 106 receives the configuration via antenna 212 and receiver 214. The first timer configuration is represented in FIG. 3 by signal 302. Although not shown in FIG. 2B, the first timer is a Prohibit timer located within the UE device 106 that prohibits the UE device 106 from transmitting a bitrate query to the base station 102 when the first timer is running.

The configuration for a second timer can be sent along with the configuration for the first timer in signal 302 of FIG. 3, or the configuration for the second timer can be sent in a separate transmission (not shown in FIG. 3). As described above, the second timer is located within the UE device 106 and prohibits the UE device 106 from transmitting another bitrate query to the base station 102 when the second timer is running. The second timer is considered an Exceptional timer, which is utilized when the exceptional condition is satisfied (e.g., the UE device 106 receives a recommended bitrate that is below the Guaranteed Bit Rate).

The base station 102 determines a recommended bitrate based on any number of suitable factors. After determining which bitrate to recommend to the UE device 106, the base station 102 transmits, via transmitter 206 and antenna 210, a recommended bitrate to be used for a Voice over Long-Term Evolution (VoLTE) call or a Video over Long-Term Evolution (ViLTE) call between the first UE device 106 and a second UE device 108. The UE device 106 receives the recommended bitrate via antenna 212 and receiver 214. The recommended bitrate is represented in FIG. 3 by signal 304. As mentioned above, the recommended bitrate may be transmitted with the configuration for the first timer or may be transmitted in a separate transmission, as shown in FIG. 3.

After receiving the recommended bitrate, the UE device 106 may elect to initiate a bitrate negotiation with the second UE device 108 to determine a bitrate to be used for the call between the first and second UE devices 106, 108. This bitrate negotiation, if it occurs, is represented in FIG. 3 by Application Layer Signaling 306. After conducting, or skipping, the rate negotiation, the first UE device 106 implements a bitrate for the call or determines that a bitrate query should be sent to the base station 102.

In the example shown in FIG. 3, the UE device 106 stops the first timer due to reception of a recommended bitrate that is below the Guaranteed Bit Rate for the call between the first UE device 106 and the second UE device 108. The UE device 106 also transmits, via transmitter 218 and antenna 212, a bitrate query to the base station 102. The bitrate query is represented in FIG. 3 by signal 308. As described above, the bitrate query may be a request for an unspecified rate increase. In other examples, the bitrate query is a request for a specific bitrate. In still other examples, the bitrate query is based, at least partially, on the radio condition of the UE device 106.

Figure 4:
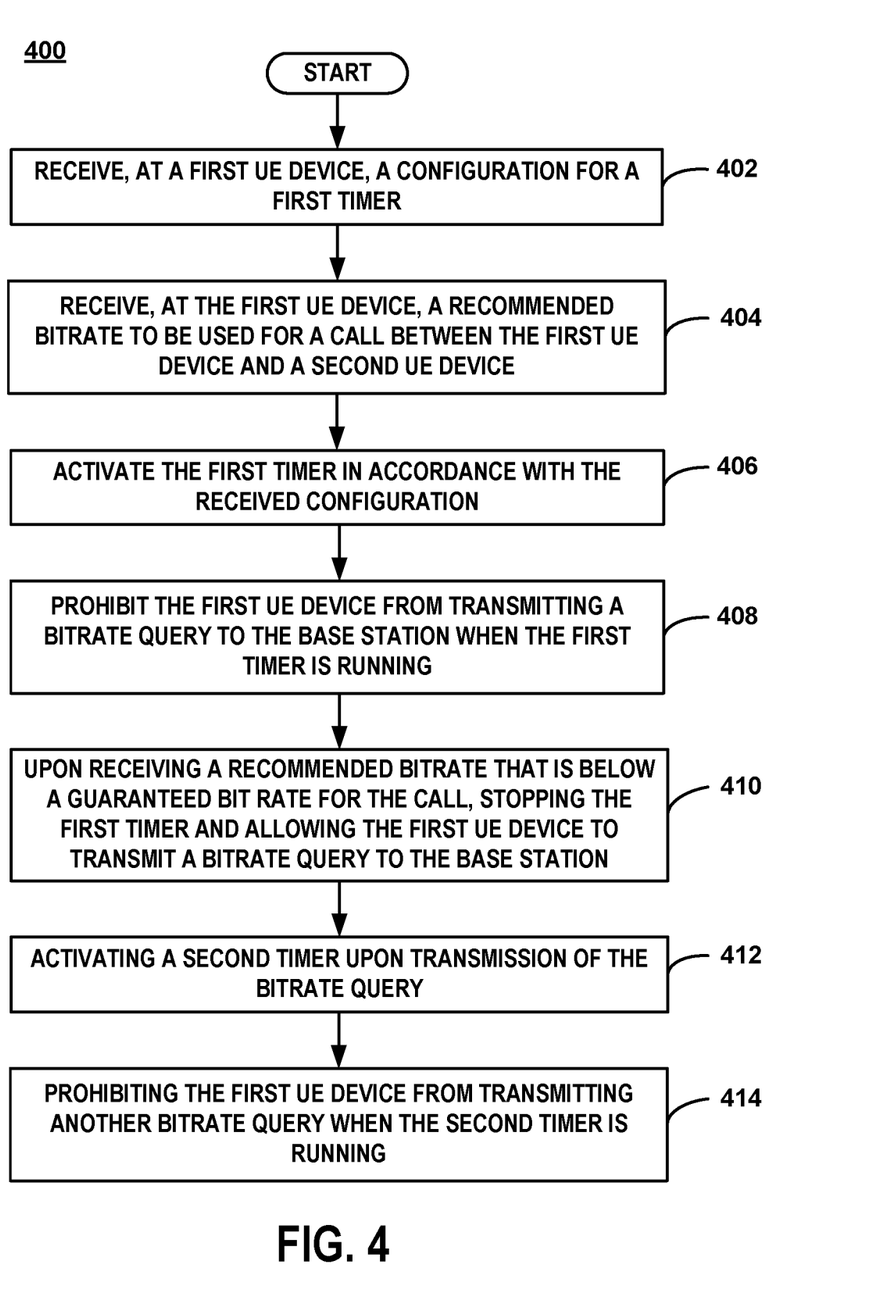
FIG. 4 is a flowchart of an example of a method in which a first timer is used to prohibit a user equipment (UE) device from transmitting a bitrate query until the UE device receives a recommended bitrate that is below a Guaranteed Bit Rate (GBR).

FIG. 4 is a flowchart of an example of a method in which a first timer is used to prohibit a user equipment (UE) device from transmitting a bitrate query until the UE device receives a recommended bitrate that is below a Guaranteed Bit Rate (GBR). The steps of method 400 may be performed in a different order than described herein and shown in the example of FIG. 4. Furthermore, in some examples, one or more of the steps may be omitted. Moreover, in other examples, one or more additional steps may be added.

In the example shown in FIG. 4, the method 400 begins at step 402, in which UE device 106 receives a configuration for a first timer from a base station 102 that is serving the UE device 106. As mentioned above, the configuration for the first timer specifies (1) which events will trigger the first timer to activate (e.g., start), restart, and stop, and (2) the duration of time that the first timer should run once the first timer has been activated or restarted.

At step 404, the UE device 106 receives a recommended bitrate from the base station 102. The recommended bitrate is to be used for a call between the first UE device 106 and the second UE device 108. The call can be a Voice over Long-Term Evolution (VoLTE) call or a Video over Long-Term Evolution (ViLTE) call.

At step 406, the first timer is activated in accordance with the configuration for the first timer. At step 408, the UE device 106 is prohibited from transmitting a bitrate query to the base station 102 when the first timer is running.

At step 410, the UE device 106 receives a recommended bitrate from the base station 102 that is below a Guaranteed Bit Rate (GBR) for the call between the first UE device 106 and the second UE device 108. Upon receipt of the recommended bitrate that is below the GBR, the UE device 106 stops the first timer. The UE device 106, in the example of FIG. 4, also transmits a bitrate query to the base station 102. As described above, the bitrate query can be merely a request for an unspecified increase in the bitrate being implemented for the VoLTE call. In other examples, the bitrate query is a request for a specific bitrate.

At step 412, the UE device 106 activates a second timer, upon transmission of the bitrate query. At step 414, the UE device 106 is prohibited from transmitting another bitrate query when the second timer is running. As described above, the second timer is an Exceptional timer located within the UE device 106 that prohibits the UE device 106 from transmitting another bitrate query to the base station 102 when the second timer is running. The second timer is considered an Exceptional timer, which is utilized when the exceptional condition is satisfied (e.g., the UE device 106 receives a recommended bitrate that is below the Guaranteed Bit Rate). In the examples in which the first timer is allowed to keep running after the UE device 106 receives a recommended bitrate below the GBR, the configuration can specify that the UE device 106 is prevented from transmitting another bitrate query until the second timer expires, even if the first timer expires but the second timer is still running.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   receiving, at a first user equipment (UE) device, a configuration for a first timer;
   receiving, at the first UE device, a recommended bitrate from a base station serving the first UE device, the recommended bitrate to be used for a call between the first UE device and a second UE device, the call being either a Voice over Long-Term Evolution (VoLTE) call or a Video over Long-Term Evolution (ViLTE) call;
   activating the first timer in accordance with the received configuration;
   prohibiting the first UE device from transmitting a bitrate query to the base station when the first timer is running; and
   upon receiving a recommended bitrate that is below a Guaranteed Bit Rate (GBR) for the call, stopping the first timer.

2. The method of claim 1, further comprises:
   upon receiving the recommended bitrate, restarting the first timer.

3. The method of claim 1, further comprises:
   upon receiving the recommended bitrate, stopping the first timer.

4. The method of claim 1, wherein the configuration prevents the first UE device from stopping the first timer before the first timer expires.

5. The method of claim 1, further comprises:
   upon receiving a recommended bitrate that is below a Guaranteed Bit Rate (GBR) for the call, allowing the first UE device to transmit a bitrate query to the base station;
   upon transmission of the bitrate query, activating a second timer; and
   prohibiting the first UE device from transmitting another bitrate query when the second timer is running.

6. A user equipment (UE) device comprising:
   a receiver configured to:
      receive, from a base station serving the UE device, a configuration for a first timer, and
      receive, a recommended bitrate from the base station, the recommended bitrate to be used for a call between the UE device and another UE device, the call being either a Voice over Long-Term Evolution (VoLTE) call or a Video over Long-Term Evolution (ViLTE) call; and
   a controller coupled to the receiver, the controller configured to:
      activate the first timer in accordance with the received configuration,
      prohibit the UE device from transmitting a bitrate query to the base station when the first timer is running, and
      stop the first timer, upon receiving a recommended bitrate that is below a Guaranteed Bit Rate (GBR) for the call.

7. The UE device of claim 6, wherein the controller is further configured to restart the first timer, upon receiving the recommended bitrate.

8. The UE device of claim 6, wherein the controller is further configured to stop the first timer, upon receiving the recommended bitrate.

9. The UE device of claim 6, wherein the configuration prevents the first UE device from stopping the first timer before the first timer expires.

10. The UE device of claim 6, wherein the controller is further configured to:
    allow the UE device to transmit a bitrate query to the base station, upon receiving a recommended bitrate that is below a Guaranteed Bit Rate (GBR) for the call,
    activate a second timer, upon transmission of the bitrate query, and
    prohibit the UE device from transmitting another bitrate query when the second timer is running.

11. A system comprising:
    a base station; and
    a first user equipment (UE) device being served by the base station, the first UE device comprising:
       a receiver configured to:
          receive, from the base station, a configuration for a first timer, and
          receive a recommended bitrate from the base station, the recommended bitrate to be used for a call between the first UE device and a second UE device, the call being either a Voice over Long-Term Evolution (VoLTE) call or a Video over Long-Term Evolution (ViLTE) call, and
       a controller coupled to the receiver, the controller configured to:
          activate the first timer in accordance with the received configuration,
          prohibit the first UE device from transmitting a bitrate query to the base station when the first timer is running, and
          stop the first timer, upon receiving a recommended bitrate that is below a Guaranteed Bit Rate (GBR) for the call.

12. The system of claim 11, wherein the controller of the first UE device is further configured to restart the first timer, upon receiving the recommended bitrate.

13. The system of claim 11, wherein the controller of the first UE device is further configured to stop the first timer, upon receiving the recommended bitrate.

14. The system of claim 11, wherein the configuration prevents the first UE device from stopping the first timer before the first timer expires.

15. The system of claim 11, wherein the controller of the first UE device is further configured to:
    allow the first UE device to transmit a bitrate query to the base station, upon receiving a recommended bitrate that is below a Guaranteed Bit Rate (GBR) for the call, activate a second timer, upon transmission of the bitrate query, and prohibit the first UE device from transmitting another bitrate query when the second timer is running.

\* \* \* \* \*